Feb. 8, 1944.  R. E. BECHTOLD  2,340,859
LIQUID DISPENSING DEVICE
Filed March 8, 1939    3 Sheets-Sheet 1
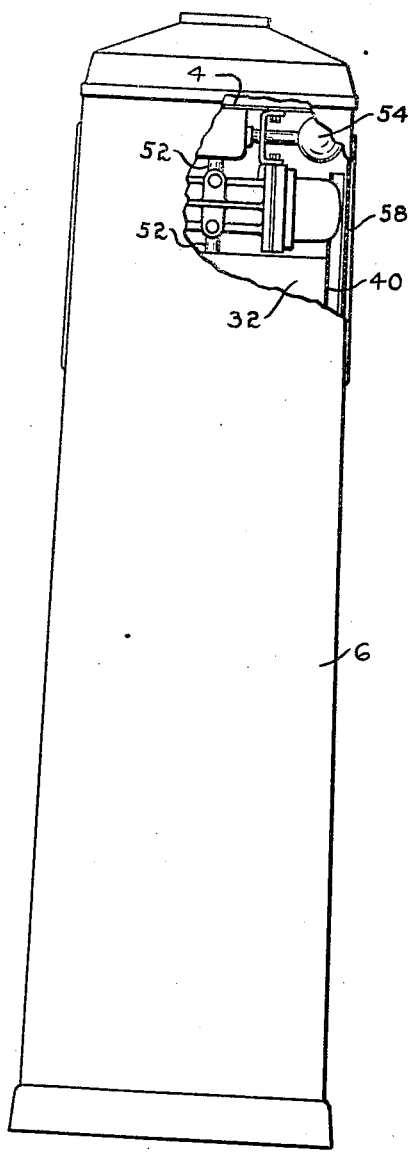
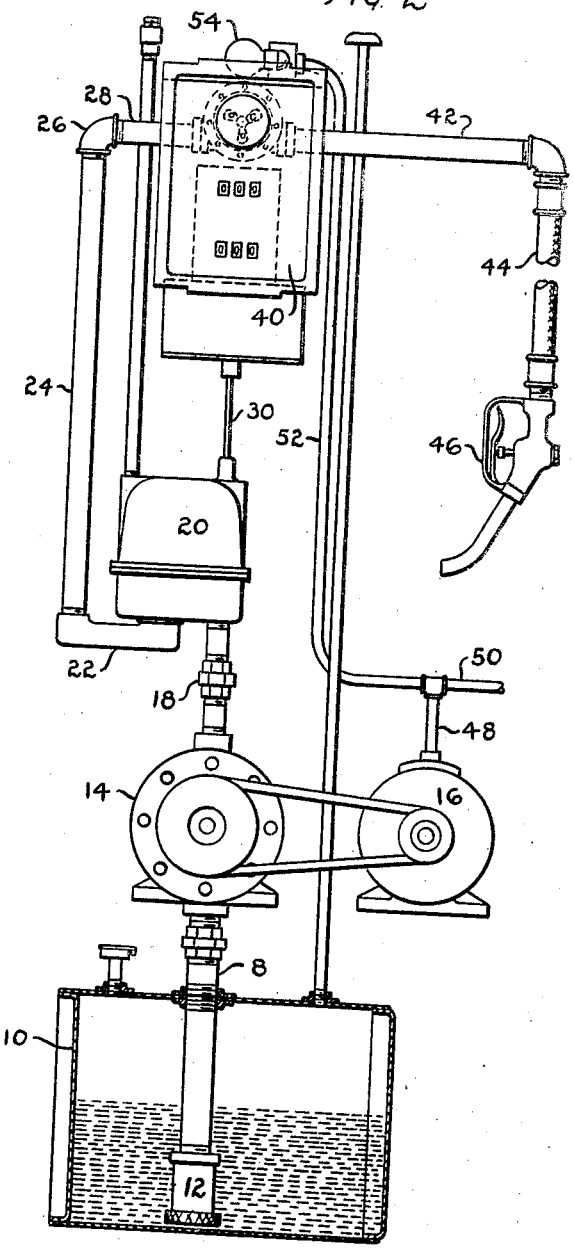
INVENTOR.
Reuben E. Bechtold
BY Cox & Moore
ATTORNEYS.

Feb. 8, 1944.                R. E. BECHTOLD                    2,340,859
                          LIQUID DISPENSING DEVICE
                           Filed March 8, 1939                 3 Sheets-Sheet 2
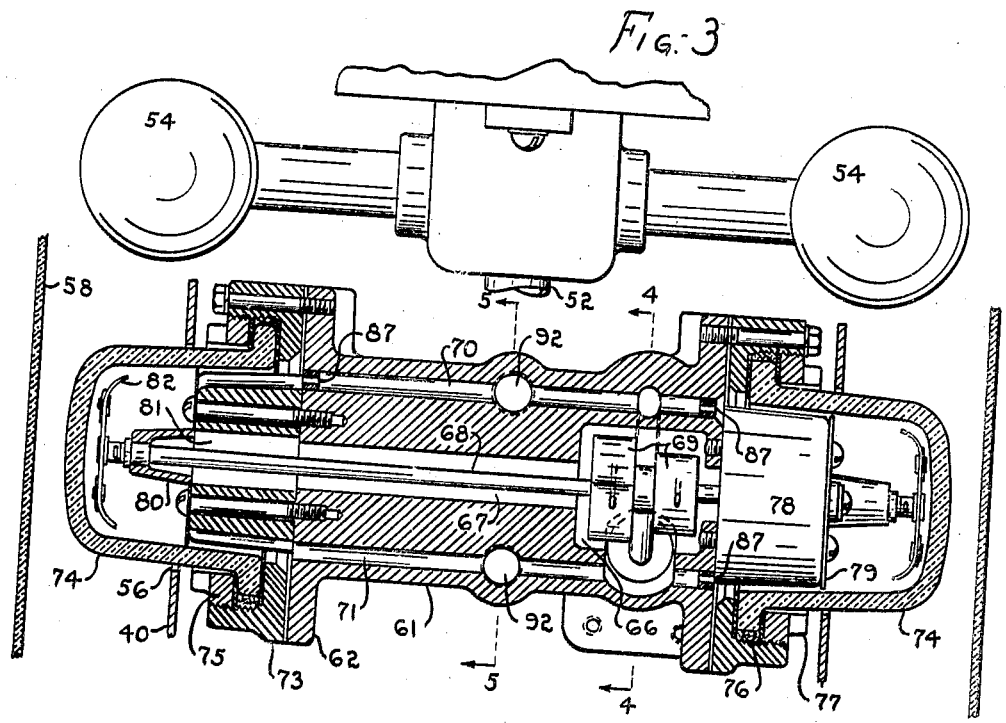
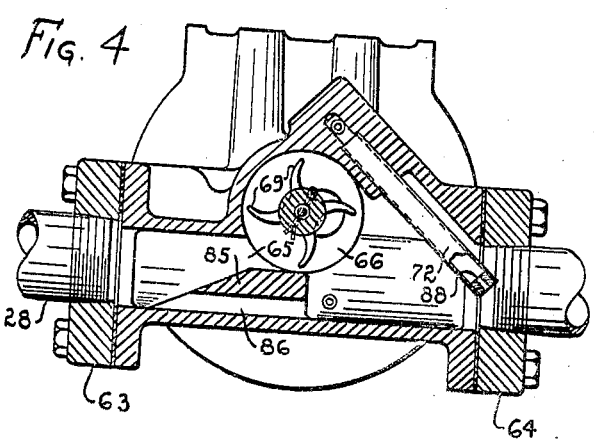
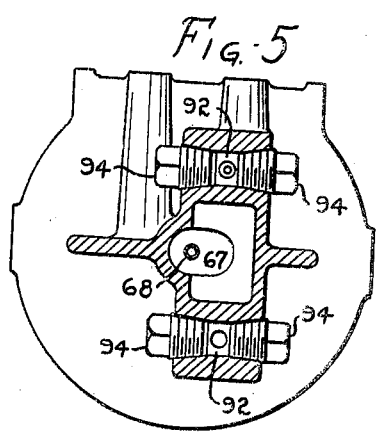
INVENTOR.
BY: Reuben E. Bechtold
    Cox & Moore
                ATTORNEYS.

Feb. 8, 1944.   R. E. BECHTOLD   2,340,859
LIQUID DISPENSING DEVICE
Filed March 8, 1939   3 Sheets-Sheet 3
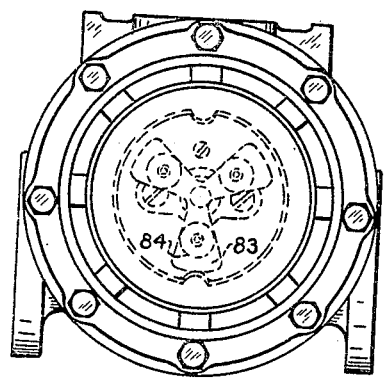
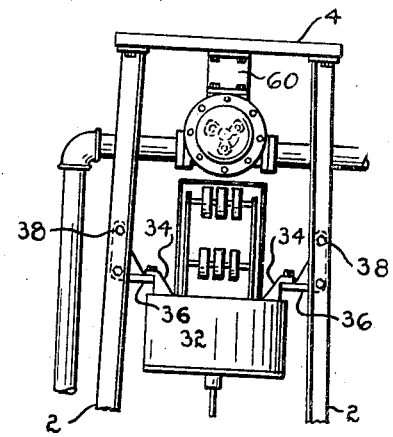
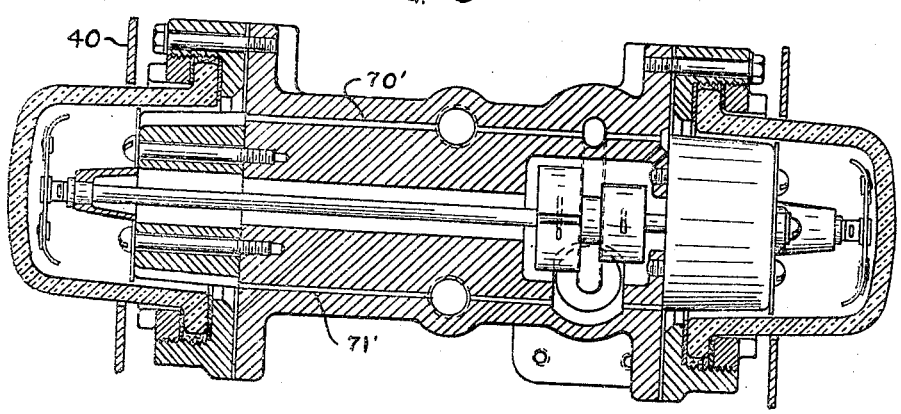
INVENTOR.
Reuben E. Bechtold
BY: Cox & Moore
ATTORNEYS.

Patented Feb. 8, 1944

2,340,859

UNITED STATES PATENT OFFICE 2,340,859

LIQUID DISPENSING DEVICE

Reuben E. Bechtold, Fort Wayne, Ind., assignor to Tokheim Oil Tank and Pump Company, Fort Wayne, Ind., a corporation of Indiana Application March 8, 1939, Serial No. 260,650

21 Claims. (Cl. 116—117)

This invention relates to liquid dispensing devices particularly adaptable for the dispensing of gasoline and similar liquids. The invention in particular relates to the construction of the sight gauge and its relation to other cooperative constructional features of the dispensing pump.

Among the objects of the present invention are to provide a sight gauge disposed in the highest portion of the liquid dispensing line whereby instantly and at all times to show if the discharge line of the dispenser is completely filled with liquid when the dispenser is not operating, and likewise to show if the liquid is properly flowing through the discharge line during the dispensing operation; to provide a sight gauge arranged and associated adjacent the numerals of the volume or price registering mechanism and preferably directly in the dial of the volume or price register, thereby compactly relating those mechanisms requiring constant observation by the attendant and thereby securing a more symmetrical and ornate arrangement and disposition of the sight gauge than heretofore; to provide a dispensing pump construction wherein the sight gauge is arranged to project through a preformed opening in the dial of the volume or price registering mechanism, thereby facilitating installation of the sight gauge and eliminating the necessity for greater tolerances in registering the sight gauge with the opening in the dial; to provide a dispensing pump including a sight gauge projecting through an opening in the register dial and disposed behind the glass panel of the register, thereby protecting the transparent casing of the sight gauge from dirt, rain and the like, and thereby permitting the disposition of the illuminating means which illuminates the dial so that it also illuminates the sight gauge and the movable indicating means within the sight gauge; to provide means for eliminating condensation of moisture of atmospheric air on the outside of the transparent casing or transparent portion of the sight gauge, thereby maintaining visibility of the interior of the sight gauge; to provide means for eliminating moisture of the atmosphere on the inner face of the register dial glass overlying the sight gauge, whereby to maintain visibility of the sight gauge; to provide a sight gauge adapted to be filled with dispensing liquid from the flow line or dispensing line and yet arranged so that if the glass bulb or transparent portion of the sight gauge should break, not more than one quart of dispensing liquid will escape therefrom; to provide means for constantly withdrawing or eliminating or discharging air or vapor tending to accumulate or collect within the sight gauge; to provide means for drawing out water tending to collect within the sight gauge; to provide a sight gauge constantly connected with the dispensing line and through which line dispensing liquid is constantly flowing during dispensing and wherein the flow through such sight gauge is only a relatively small portion of the flow through the dispensing line so that a relatively small volume of liquid in the sight gauge is being replenished during dispensing, whereby to prevent undue quick changes in the temperature of the liquid within the sight gauge as compared with the temperature of the air surrounding the sight gauge, and thereby preventing the formation of misting or condensation of the moisture of the air on the outer surface of the sight gauge; to provide a sight gauge which can be quickly and easily dismantled for cleaning; to provide a sight gauge formed of a plurality of cored castings providing a simple arrangement of liquid passages together with a simple arrangement of spinner or indicator operating means propelled by the dispensing fluid; to provide a novel arrangement for the registering dial of a dispensing pump having associated and predetermined openings not only for the variously operating dials of the computer mechanism but also for the sight gauge; to provide in dispensing apparatus of the character described, an improved mounting for the computing mechanism, the registering dial therefor, the sight gauge, the illuminating means therefor, and the enclosing housing and glass panel for the registering dial; to provide these and other objects of invention as will be apparent from a perusal of the following specification when taken in connection with the accompanying drawings, wherein:

Fig. 1 is a side elevation of a service station pump, showing the housing partly broken away to disclose the position of the sight gauge located within the housing;

Fig. 2 is a diagrammatic view of the working parts of a liquid dispenser and including the arrangement of the sight gauge in connection with the dial of the computer head or registering mechanism;

Fig. 3 is a side elevation showing in section various parts of the sight gauge, and showing the arrangement of the lighting mechanism with respect thereto;

Fig. 4 is a transverse section of Fig. 3 on the line 4—4 thereof;

Fig. 5 is a similar cross section of Fig. 3 on the line 5—5 thereof;

Fig. 6 is an end elevational view of the sight gauge;

Fig. 7 is a view showing the manner in which the registering mechanism or computer head is rigidly attached to the rigid frame of the service station pump, and showing also the manner in which the sight gauge is likewise attached;

Fig. 8 is an end view of the impeller, the shaft being shown in section; and

Fig. 9 is a modified constructional view of the sight gauge corresponding to the view shown in Fig. 3.

Referring now to the drawings in detail, the invention discloses any type of service station equipment pump or dispenser for dispensing gasoline or the like, which comprises the usual type of rigid frame comprising four vertically disposed uprights or corner posts 2, preferably rigidly formed of angle irons, suitably braced and integrally united together by one or more cross braces, and including likewise a top brace 4, see Fig. 7. These four corner posts, together with the usual type of base frame and including the top frame 4, provide a rigid metallic skeleton or frame around which is disposed the usual type of sheet metal housing or upstanding casing, herein shown as 6.

As clearly shown in Fig. 2, the elements of the liquid dispenser or service station pump which are disposed within and enclosed by the upstanding casing or housing 6, comprise a liquid dispensing line 8 which is adapted to connect with any type of underground tank or reservoir 10. The pipe 8, forming the dispensing line, is adapted to extend downwardly into this housing, and is provided at its bottom with the usual type of foot valve 12. A pump 14, of any desired description, has its inlet end connected to the pipe 8. A motor 16 is drivingly connected to the pump 14. The discharge side of the pump is connected by means of a suitable conduit 18 forming a part of the dispensing line and discharges into a meter 20, the discharge side of which connects by means of a pipe 22 extending vertically upwardly, as at 24. The upward end of this pipe is connected by means of an elbow fitting 26 to the pipe 28 which connects to the inlet side of the sight gauge, as shown clearly in Fig. 4.

The rotatable spindle 30 of the meter 20 extends upwardly and is adapted to drive the volume and/or price register. In the present instance I have shown the meter spindle as driving the usual type of volume and price computing head, which computing head is preferably a separate article of manufacture and is integrally installed and fastened into position rigidly with respect to the framework of the pump. In Fig. 7, I have shown this computer head 32 provided with laterally extending brackets 34 which rigidly connect to brackets 36 rigidly fastened to the vertical side posts 2, as at 38. In this manner the computer head is always rigidly positioned in a definite location with respect to the rigid frame of the housing.

The usual dial 40 of the computer head is not shown in Fig. 7; however, this dial is shown in Fig. 2. A pipe 42, leading from the discharge side of the sight glass, and forming a part of the dispensing line, terminates in the usual type of flexible hose 44 which in the present instance is provided with the usual type of valved control nozzle 46. Suitable electrical connections 48 connect the motor 16 with an electrical line 50 forming a source of supply, and this line has a branch connection 52 to a pair of lights 54.

The construction of the sight gauge, together with its manner of mounting with respect to the housing frame members, with respect to the dial for the registering or computing mechanism, and particularly with respect to the dial face of the registering mechanism, forms one of the aspects of the subject matter of the present invention.

In the present invention, the sight gauge has been mounted rigidly on the rugged framework 4 forming the aforementioned skeleton of the pump housing, and in a manner such that it always is maintained in predetermined position with respect to the dial of the registering mechanism. In fact, it is desired to arrange the sight gauge so that the transparent element thereof is adapted to project through an opening 56 in this dial in a manner such that it is enclosed by and directly in the rear of the usual glass panel 58 of the housing 6, which glass panel forms an enclosing face for the entire dial 40 of the registering mechanism. To this end, a bracket 60 is provided which is rigidly attached to the upper framework 4, as shown in Fig. 7, and is connected at its lower portion to the top of the sight glass body.

The sight gauge itself comprises housing means herein shown as a body 61 having at each end thereof a flange or head 62. In addition, the body is provided at each side thereof with corresponding members constituting respectively an inlet port 63 and an outlet port 64 connected by a cross channel 65. The body is preferably formed of a casting. Within the body 61, preferably near one end thereof, is formed a main or actuator chamber 66 through which the main body of dispensing liquid is adapted to flow. In short, this body is in direct communication with the main dispensing line of the pump.

Extending lengthwise entirely through the body of the sight gauge and communicating with the chamber 66 is provided a bore 67 for the accommodation of a shaft 68. This shaft extends through the bore and has mounted on it a pair of bladed impeller wheels 69 which are disposed within the chamber 66.

The main body or casting 61 is provided with upper and lower longitudinal ducts 70 and 71, respectively, which extend throughout the length of the body. The lower duct 71 communicates with the cross channel 65, and there is positioned in the body 61 a tube constituting a nozzle 72, the upper end of which communicates with the duct 70 and extends slantingly downwardly therefrom, protruding into the cross channel 65. The lower end of this nozzle terminates approximately at the axis of the cross channel at its outlet port end. Thus, upon flow of liquid through the cross channel, suction is created through the nozzle 72, the purpose of which will be hereinafter described.

Upon the outer face of each head 62 of the main body 61 is secured a fixture 73 in which is supported a corresponding transparent globe 74. The globes form chambers having a transparent wall and are held by said fixtures in axial alinement with the impeller shaft 68. The fixtures preferably have corresponding rings 75 which are threaded in said fixtures and engage the flanged inner ends 76 of said globes, thereby to clamp the globes securely in connection with their fixtures. The rings are provided with a series of outwardly extending lugs 77 by means of which they are conveniently placed in position or removed, as occasion may require, by applying a suitable tool thereto.

Upon each end of the main body of the sight glass is secured a block constituting a filler 78 that projects part way into the corresponding globe 74. This filler 78 has secured on its outer end a reflector plate 79 and in addition a bearing bracket 80, through which the corresponding end of the impeller shaft extends and in which bracket the impeller shaft is supported for rotary movement. The fillers 78 thus serve as a means for not only supporting the reflector plate and the bearing bracket 80, but also function to cut down the fluid holding capacity of the transparent globes so that in the event of breakage a minimum amount of liquid may escape.

Each filler in addition has an axial bore 81 alined with the bore 87 through which the impeller shaft extends and upon the outer ends of said impeller shaft are secured corresponding spinners 82 axially disposed thereon respectively within the globes. Each spinner preferably has radial blades 83 having thereon corresponding disks 84 of suitable material and preferably of contrasting colors so that the attractiveness of the spinner is thereby enhanced.

Within the cross channel 65 is disposed a lug constituting a deflector 85 located adjacent the bottom of the chamber 66. This deflector 85 is provided in its lower part with a longitudinal passageway 86, by which arrangement a substantial portion of the liquid flowing through the cross channel 65 is directed against the pendent blades of the impeller wheels, thereby causing rotation of the impeller shaft and the spinner secured thereon.

When the liquid flowing through the dispensing line under pressure from the pump reaches the cross channel 65 and flows past the lower end of the nozzle 72, the suction thereby created in the nozzle by the flow of the liquid therepast causes flow of fluid from the cross channel through the duct 71 into the globes 74, which thereupon become filled with the liquid, which together with any entrained air or vaporized gas is withdrawn from the globes through the duct 70 and the nozzle 72 and passes through the outlet port 42. Thus, as the dispenser operates, a portion of the liquid passing through the cross channel 65 is continuously sucked therefrom and continuously circulated through the globe structures. The passageway 86 in the deflector allows for complete drainage of the gauge when cleansing or replacement of parts is required.

Means is provided for preventing too rapid and too great a change of liquid or too large a volume of flow into and through the globes, whereby to prevent misting or clouding not only of the globes themselves but also of the inner face of the glass panel 59 of the housing. For instance, on particularly humid days, if relatively cold gasoline is pumped from an underground tank, if sufficient quantities of this relatively cold gasoline are circulated through the globes 74, the constantly replaced cool gasoline will cause the moisture in the air to be deposited not only upon the outer face of the globe but will likewise, through proximity of this now relatively cool globe to the inner face of the glass panel 58, cause moisture to be deposited upon the inner face of the glass panel 58. This will prevent a clear observation of the spinner within the globe, thereby defeating the purpose of the sight gauge.

For preventing all of this, I have provided means for restricting the flow of gasoline through the globes so that the gasoline therein will not be so quickly replenished by the cool gasoline directly from the underground tank. In other words, I propose to maintain a relatively greater stagnant condition of the liquid in the globes while at the same time maintaining a gentle, restricted flow of the gasoline therethrough, whereby to prevent the liquid arriving in a sufficiently cold condition into the globe to cause cooling of the bowl and consequent precipitation of moisture thereon.

For this purpose, the circulating channel 70 is restricted either by the provision of choke bushings 87 placed preferably in one or both ends of the ducts 70 and 71, or by the formation of relatively restricted channels 70' and 71', as shown in Fig. 9. In order to establish an equal balance in the flow of liquid through the globes, these choke bushings 87 are placed preferably in both ends of the duct 70 and in one end of duct 71, the bushings being made to have bores arbitrarily of selected diameters as required accordingly to restrict the flow of liquid circulating through the globes. In addition, the outer end of the nozzle 72 is provided with a similar bushing 88, the bore of which is made of selected diameter arbitrarily according to the desired rate of flow therethrough. By arrangement in this manner, the proportion of liquid which passes through the cross channel to that which is circulating through the globes is definitely restricted. By utilizing bushings of various restrictions, adjustable circulation through the globes may be provided.

By reference to the drawings, it will be noted that the light bulbs 54 are arranged so as not only to illuminate the dial and numerals of the computing and registering mechanism but also to shine directly downwardly upon the glass bowl whereby to illuminate the rotating spinner.

It will also be evident that by mounting the computer head rigidly on the upright members 2 in a predetermined fixed position, and likewise mounting the sight glass body 61 in predetermined position rigidly upon this same frame, I am enabled exactly to predetermine and maintain the position of the glass bulb projecting through the exactly preformed opening in the dial of the registering mechanism so that the bulb will make an exact fit through this opening. This makes a much better assembly than in instances where a sight glass bulb is adapted to project through a preformed opening in the housing proper, due to the fact that the housing is not generally rigidly mounted and therefore the hole therein will not fit exactly around the bulb which projects therethrough, which accordingly necessitates the formation of a much larger hole in the housing than it is necessary to form in the rigidly mounted dial plate.

In addition, by projecting the sight glass visible bulb or bowl through the opening in the dial plate, I am enabled to utilize the pane of glass which faces and encloses the dial of the computing mechanism, as also a glass housing for the sight glass bowl or globe, thereby keeping out dust and dirt so as to maintain the same transparent. Furthermore, by mounting the glass globe in the opening through the dial for the registering mechanism, and in arranging the single lighting means thereabove, the arrangement permits a single lighting means to illuminate not only the dial, the shifting registering numerals on the dial, but also the spinner in the sight glass globe.

It will be understood that normally when the apparatus is in proper condition for operation, the dispensing line is completely filled with liquid, as are also the globes 74, which provides indicating means that the dispenser is in proper condition for dispensing liquid. If, however, the globes 74 are only partially filled or are empty, upon starting of the dispensing operation, the surge of fluid in the globes will be clearly manifest and will indicate an improper condition for the dispensing operation, and thus need of inspection and readjustment of the various parts of the dispensing apparatus. It is also apparent that by placing the sight glass transparent globe in a position to project through the dial of the registering means, it is compactly related and positioned with respect to the indicating dials, so that the attendant may watch all of these at a single glance. Furthermore, by thus centrally locating the sight glass globe, a more symmetrical, ornate and pleasing appearance is provided.

It will be noted that I have provided suitable bores 92 transversely of the longitudinal bores 70 and 71 to facilitate drilling of the main body or casting. These bores are adapted to be closed by threaded plugs 94, as shown in Fig. 5.

This application contains subject matter in common with my prior application Serial No. 99,764, filed September 8, 1936.

The invention is hereby claimed as follows:

1. A sight gauge for the discharge line of a liquid dispenser, said gauge having a body provided with upper and lower ducts, an impeller chamber and a channel providing inlet and outlet ports, said channel having communication with said chamber and lower duct, sight globes secured to the ends of said body and having communication with both of said ducts, a shaft mounted for rotary movement and provided with impeller means disposed in said chamber, said shaft having on its ends spinners disposed respectively in said globes, means connected with said upper duct and arranged to be influenced by the flow of liquid through said channel to cause a portion of the liquid passing through the channel to circulate through said globes and ducts, and choke members arranged to equalize a flow of liquid in said globes.

2. A sight gauge for the discharge line of a liquid dispenser, said gauge having a body provided with upper and lower ducts, an impeller chamber and a channel providing inlet and outlet ports, said channel having communication with said chamber and lower duct, sight globes secured to the ends of said body and having communication with both of said ducts, a shaft mounted for rotary movement and provided with impeller means disposed in said chamber and having on its ends spinners disposed respectively in said globes, and means connected with said upper duct and arranged to be influenced by the flow of liquid through said channel to cause a portion of the liquid to pass from the channel through said globes and ducts.

3. In a liquid dispensing device, a sight gauge comprising means forming a conduit through which liquid flows during a dispensing operation, means forming a chamber having a wall portion through which a flow of liquid through the chamber may be observed, means for conducting through said chamber a relatively small portion only of the liquid flowing through said conduit, flow indicating means disposed in said chamber, and means in said conduit and operated by the liquid flowing through the conduit and operatively connected to said flow indicating means for applying driving forces to said flow indicating means.

4. In a dispensing device, a sight gauge comprising a body portion having formed therein a first channel through which the liquid flows during a dispensing operation, means forming an enclosure having a transparent wall portion, a shaft in said body portion and extending from said channel into said enclosure, an impeller on said shaft and disposed in the channel of said body portion for actuating said shaft as the liquid flows through said channel, means forming second and third liquid flow channels in said body portion and extending into said enclosure at spaced points, means for diverting a portion of the liquid from said first channel through said second channel and into said enclosure, thence through said enclosure and through said third channel back to said first channel, and an indicator in said enclosure and operatively connected to said shaft.

5. In a sight gauge for a liquid dispensing device comprising a body portion having a main channel through which liquid flows during a dispensing operation, detachable caps mounted at the opposite ends of said body portion, each cap having a transparent wall portion, said body portion having auxiliary spaced channels connected at spaced points with each of said caps, one of said auxiliary channels being connected to said main channel, an aspirating tube having one end connected with the other of said auxiliary channels and having its opposite end disposed in the main channel for drawing liquid from the main channel through said auxiliary channels and said caps and to draw air from said caps.

6. A sight gauge for the dispensing line of a liquid dispenser, said gauge comprising a body portion having upper and lower ducts extending between opposite ends of the body portion and also a channel affording liquid inlet and outlet ports, said channel having communication with said lower duct, a nozzle connected with said upper duct and extending into said channel, transparent globes mounted on the opposite ends of said body portion, each globe being in communication with both of said ducts, bushings of selected bore positioned in said ducts to equalize the passage of liquid through said globes, a bushing of selected bore positioned in said nozzle to restrict the flow of liquid therethrough, a reflector mounted in each globe in spaced relation to a forward wall portion of the globe so that the liquid flowing through each globe passes between the reflector and said forward wall portion of the globe, a shaft extending through said body portion from said channel into said globes, said shaft having an impeller wheel thereon disposed in said channel for actuation by liquid flowing through said channel and spinners secured on the ends of said shaft within said globes.

7. A sight gauge for the dispensing line of a liquid dispenser, said gauge comprising a body portion having upper and lower ducts extending between opposite ends of the body portion and also a channel affording liquid inlet and outlet ports, said channel having communication with said lower duct, a nozzle connected with said upper duct and extending into said channel, transparent globes mounted on the opposite ends of said body portion, each globe being in communication with both of said ducts, means associated with said ducts to equalize the passage of liquid through said globes, means associated with said nozzle to restrict the flow of liquid therethrough, a shaft extending through said body portion from said channel into said globes, said shaft having an impeller wheel thereon disposed in said channel for actuation by liquid flowing through said channel and spinners secured on the ends of said shaft within said globes.

8. A sight gauge for the dispensing line of a liquid dispenser, said gauge comprising a body portion having upper and lower ducts extending between opposite ends of the body portion and also a channel affording liquid inlet and outlet ports, said channel having communication with said lower duct, transparent globes mounted on the opposite ends of said body portion, each globe being in communication with both of said ducts, a shaft extending through said body portion from said channel into said globes, said shaft having an impeller wheel thereon disposed in said channel for actuation by liquid flowing through said channel, spinners secured on the ends of said shaft within said globes and an aspirator connected with said upper duct and extending into said channel for causing the liquid flowing through said channel to suck liquid from said channel through said lower duct, said transparent globes and said upper duct back to said channel.

9. A sight gauge for a liquid flow line, said gauge comprising a body portion having an actuator chamber and means forming an indicator chamber spaced from said actuator chamber, said indicator chamber having a transparent wall, said body portion having a channel extending therethrough and having communication with said actuator chamber to provide liquid inlet and outlet ports for said actuator chamber, mechanism including an actuator located in the actuator chamber and movable indicating means located in said indicator chamber and operatively connected with said actuator, and means connecting said indicator chamber to said channel and having a bore of selected cross-sectional dimension providing a by-pass to said indicator chamber for a portion only of the liquid flowing through said channel.

10. In a liquid dispensing device, a sight gauge construction comprising housing means providing spaced actuating and indicating chambers, said indicating chamber having a transparent wall portion through which a flow of liquid through said indicating chamber may be observed, a shaft in said housing means and extending from said actuating chamber into said indicating chamber, an indicator in said indicating chamber and operatively connected to said shaft for actuation thereby, said housing means having a liquid inlet therethrough into the actuating chamber and a liquid outlet therethrough from the actuating chamber whereby liquid is adapted to flow through said actuating chamber during a dispensing operation, an actuator in said actuating chamber and operatively connected to said shaft for actuating the shaft by the liquit flowing through said actuating chamber, means for carrying a portion of the liquid entering said housing means through said inlet to said indicating chamber, and means actuated by the liquid flowing through the outlet from the actuating chamber and operatively connected to the indicating chamber for discharging liquid and vapor from said indicating chamber.

11. In a liquid dispensing device, a sight gauge comprising means forming an actuating chamber through which the main stream of liquid flows during a dispensing operation, an actuator in said chamber operated by the main stream of liquid flowing through said chamber, means forming indicator chambers spaced from said actuating chamber in different directions, each of said chambers having a transparent wall through which liquid in the indicator chamber may be observed, actuatable flow indicating means in each indicator chamber, a motion transmitting connection between said actuator and each of said flow indicating means whereby upon movement of the actuator said indicating means are actuated to indicate liquid flow, and means for bypassing a portion only of the main stream of liquid flowing through said actuating chamber through each of said indicator chambers whereby a restricted stream of liquid flows through each of said indicator chambers simultaneously with the actuation of the indicating means by the main stream of liquid flowing through the actuating chamber.

12. A sight gauge for the dispensing line of a liquid dispensing device, said sight gauge comprising a first conduit having inlet and outlet ports for connection to said line, a second conduit having a transparent wall portion through which a flow of fluid in the second conduit may be observed, means providing a passage a portion of which is of relatively small cross-section compared to the first conduit for carrying a portion of the liquid from said first conduit through the second conduit, and suction means connected to the second conduit for drawing liquid through the passage into the second conduit and withdrawing air, vapor and liquid from said second conduit, said suction means including means for discharging the air, vapor and liquid withdrawn from the second conduit into the outlet port of said first conduit.

13. A sight gauge for a liquid flow line, said gauge comprising a body having an actuator chamber and a sight chamber spaced from said actuator chamber, said body having a liquid inlet and a liquid outlet, said inlet and outlet connecting with said actuator chamber whereby liquid is adapted to flow through said actuator chamber, means for passing a restricted portion only of the liquid entering said inlet through said sight chamber into said outlet, a liquid driven actuator in said actuator chamber, a flow indicator in said sight chamber and a driving connection between said liquid driven actuator and said flow indicator whereby the flow of liquid through said actuator chamber forms a source of power for driving said flow indicator.

14. A sight gauge for a liquid flow line comprising a body having an impeller chamber, a sight chamber having a transparent wall, said body having a channel communicating with said impeller chamber and having inlet and outlet ends for the liquid, said body also having liquid inlet and outlet ducts for said sight chamber and communicating with said sight chamber, said ducts communicating with said channel, means for creating a suction in the outlet duct whereby to cause the positive circulation of a portion of the liquid in said channel through said inlet duct, thence through said sight chamber and said outlet duct into the outlet end of said channel, a liquid driven impeller in said impeller chamber, a movable flow indicator in said sight chamber, a driving connection from said impeller to said flow indicator whereby the liquid flowing through said impeller chamber drives said flow indicator in said sight chamber.

15. A liquid dispensing apparatus comprising in combination, a dispensing line adapted to be connected to an underground source of liquid supply, a dispensing outlet arranged at the discharge end of said line, means for propelling liquid through said line, a meter in said line for measuring the liquid flow therethrough, a housing above the ground within which a portion of said line is adapted to be arranged, a sight glass carried by said housing, a portion of said dispensing line being provided with a plurality of conduits disposed in parallel and adapted to collectively transmit the liquid flow of the dispensing line, and said sight glass being disposed in one of said conduits, whereby the liquid flow through said sight glass constitutes only a fraction of the total liquid flow within the dispensing line from said underground tank, whereby to minimize the rate of temperature changes of said sight glass.

16. A liquid dispensing apparatus as defined in claim 15, wherein flow limiting means is disposed in the path of travel of the liquid through the sight glass whereby only a relatively small part of the total liquid flow within the dispensing line passes through the sight glass.

17. A liquid dispensing apparatus as defined in claim 15, wherein heating means is carried by the housing in juxtaposition to the sight glass to effect the heating thereof.

18. A liquid dispensing apparatus as defined in claim 15, wherein the housing is provided with a transparent panel, and wherein the sight glass is mounted within the housing behind the panel, whereby to be observable through the panel and disposed within a relatively dead air space within the housing.

19. A liquid dispensing apparatus comprising a dispensing line adapted to be connected to a source of liquid supply, a dispensing outlet disposed at the discharge end of said line, means for propelling liquid through said line, a meter disposed in said line and adapted to measure the liquid flow therethrough, register mechanism for the meter, said register mechanism comprising a dial having an opening and a register indicator driven by the meter and cooperable with said dial opening, a sight glass disposed in said dispensing line, said sight glass being cooperable with a second opening in said dial, whereby said register indicator and said sight glass are disposed on a common dial structure and observable in conjunction therewith, a housing for the apparatus, said housing having a transparent window, said dial, register indicator, and sight glass being mounted within the housing behind the window, a lamp also mounted within the housing in juxtaposition to the dial, the rays of the lamp being projected onto the face of the dial, and said lamp being arranged to effect the heating of the air within the housing between the window and the dial whereby to minimize condensation on said sight glass.

20. A liquid dispensing apparatus comprising a dispensing line adapted to be connected to a source of liquid supply, a dispensing outlet disposed at the discharge end of said line, means for propelling liquid through said line, a meter disposed in said line and adapted to measure the liquid flow therethrough, register mechanism for the meter, said register mechanism comprising a dial having an opening and a register indicator driven by the meter and cooperable with said dial opening, a sight glass disposed in said dispensing line, said sight glass being cooperable with a second opening in said dial, whereby said register indicator and said sight glass are disposed on a common dial structure and observable in conjunction therewith, a housing for the apparatus, said housing having a transparent window, and said dial, register indicator, and sight glass being mounted within the housing behind the window, a lamp also mounted within the housing behind an opaqued portion thereof and in juxtaposition to the dial, the rays of the lamp being projected onto the face of the dial and the sight glass.

21. A liquid dispensing apparatus comprising in combination, a dispensing line adapted to be connected to a source of liquid supply, a dispensing outlet connected to the discharge end of said line, means for propelling liquid through said line, a meter disposed in said line for measuring the liquid flow therethrough, register mechanism for the meter, said register mechanism comprising a pair of oppositely facing dials and meter driven register indicators cooperable therewith, a visi-gauge mechanism disposed in said dispensing line for observing the liquid flow therethrough, a sheet metal housing, a rigid frame disposed within said housing, said frame comprising a base, a pair of spaced uprights and a cross brace connecting the uprights adjacent the upper ends thereof, said register mechanism including said dials and register indicators being mounted on said frame adjacent the upper portion thereof, said visi-gauge mechanism also being mounted on said frame at its upper portion in juxtaposition to said dials, said visi-gauge mechanism having structural portions thereof projecting through cut away portions in both said dials with the margins of said structural portions substantially abutting the cut away edges of the dials, and a pair of oppositely disposed transparent windows in the housing through which said dials, register indicators, and visi-gauge portions may be observed respectively from the oppositely facing exterior sides of the housing, said windows being smaller than the dials and being positioned closely adjacent thereto when the parts are in operative position.

REUBEN E. BECHTOLD.

CERTIFICATE OF CORRECTION.

Patent No. 2,340,859. February 8, 1944.

REUBEN E. BECHTOLD.

It is hereby certified that error appears in the printed specification of the above numbered patent requiring correction as follows: Page 3, second column, line 60, for "ragidly" read --rigidly--; page 5, first column, line 28, claim 8, for the word "such" read --suck--; and that the said Letters Patent should be read with this correction therein that the same may conform to the record of the case in the Patent Office.

Signed and sealed this 27th day of June, A. D. 1944.

(Seal)

Leslie Frazer
Acting Commissioner of Patents.